(12) United States Patent
Mikame

(10) Patent No.: US 7,722,188 B2
(45) Date of Patent: May 25, 2010

(54) EYEGLASS FRAME

(75) Inventor: Tetsuo Mikame, Tokyo (JP)

(73) Assignee: Four Nines, Inc., Tokyo (JP)

( * ) Notice: Subject to any disclaimer, the term of this patent is extended or adjusted under 35 U.S.C. 154(b) by 0 days.

(21) Appl. No.: 12/078,823

(22) Filed: Apr. 7, 2008

(65) Prior Publication Data

US 2009/0251659 A1  Oct. 8, 2009

(51) Int. Cl.
*G02C 3/00* (2006.01)
(52) U.S. Cl. .................... 351/153; 351/113; 16/228
(58) Field of Classification Search ................. 351/113, 351/153, 114, 111, 110, 140, 41; 16/228
See application file for complete search history.

(56) References Cited

U.S. PATENT DOCUMENTS 3,923,384 A * 12/1975 Leblanc ..................... 351/113
6,113,235 A * 9/2000 Yamamoto .................. 351/113
6,139,143 A * 10/2000 Brune et al. ................ 351/153
7,246,900 B2 * 7/2007 Fujimoto .................... 351/113

* cited by examiner

*Primary Examiner*—Hung X Dang
(74) *Attorney, Agent, or Firm*—Bacon & Thomas, PLLC

(57) ABSTRACT

An eyeglass frame is formed so as to eliminate pain to a wearer when the frame nips the head of the wearer for a long period of usage. The eyeglass frame includes a front frame made of plastic or metal for holding lenses, a pair of elastic bodies, a first end of each elastic body is attached to either side of a rear face of the front frame and is bent inwardly at a central portion thereof, and a temple disposed at a second end of each elastic body. The temple has an end cover. One of the first end and the second end of the elastic body is connected to a hinge.

1 Claim, 6 Drawing Sheets

F I G. 2
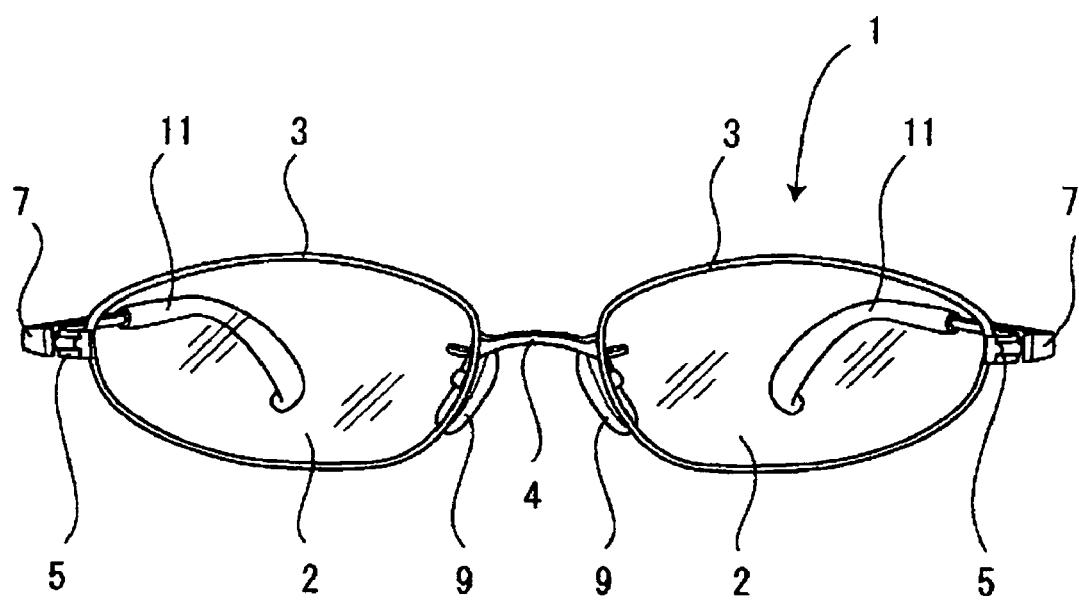

F I G. 3
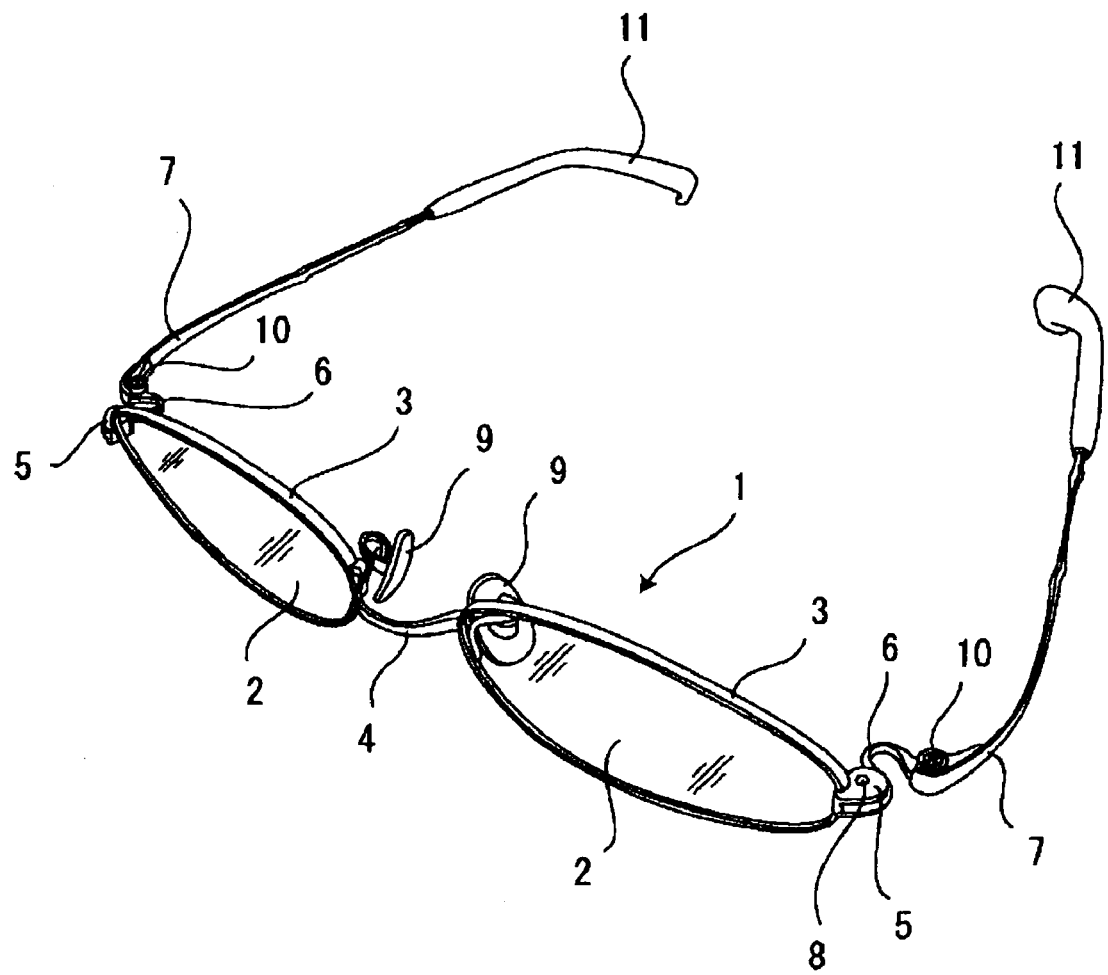

EYEGLASS FRAME

BACKGROUND OF THE INVENTION

1. Field of the Invention

The present invention relates to an eyeglass frame on which temples are attached via elastic bodies on both sides of the rear face of a front frame which holds lenses.

2. Description of the Related Art

Generally, in a front frame of eyeglass, there are such types as a full rim type as described in JP, A, 2003-43427, or a half rim type. A pair of temples that contact with side faces of users' head are provided on both sides of the rear face of the rim that is for installing lenses so as to be rotatable inwardly and foldable from the predetermined expanded condition.

In usual eyeglass frames arranged as described above, users use an eyeglass in such a way that the temples nip the user's head at both sides of ears in a condition where the temples are rotated fully outwardly to come to an end. Further, temple bending curvature is mainly adjusted so that a user can be released from tightness while wearing eyeglasses.

In a conventional eyeglass frame as described above, however, the optimum condition for users is intended to be secured by adjusting mainly the temple bending curvature, which causes such a problem that temple adjustment affects armor portion attached to the rim since the temple is integrated with the armor.

Moreover, as the adjustment is mainly carried out by the temple adjustment, it is inevitable by all means to bend the temple without deforming the front frame side portion of the temple. Due to this fact the adjustment comes to a result that apart of inside surface of the temple contacts with a point of user's head and the contacting force with the head becomes big, which causes a problem of potential risk of pain.

SUMMARY OF THE INVENTION

According to the present invention, a temple that is arranged to be foldable inwardly from the predetermined unfolded position is joined via elastic body so that the whole temple is capable to be displaced. Owing to this arrangement, only small contacting force is applied to the user's head and hence wearing consciousness is reduced. Thus, the present invention provides an eyeglass frame that has no potential risk of pain on the user's head.

According to the present invention, a temple that is arranged to be foldable inwardly from the predetermined unfolded position is connected to one end of an elastic body, while the other end of which is fixed with the front frame so that the whole temple is capable of being displaced. Thereby an end cover connected to the temple contacts with the head of user via a flat face so that small amount of contacting force is applied against the head of user. Thus, the present invention provides an eyeglass frame that gives less wearing consciousness and has no potential risk of pain on the head.

The present invention has such an arrangement that an eyeglass frame includes a front frame for holding lenses, and a pair of temples provided at both sides of a rear face of the front frame respectively, for nipping a head of a user, wherein an elastic body which is bent inwardly at a middle portion thereof is provided respectively between the front frame and temple.

The front frame is to be made of metal or plastic and the temple is to be made of metal or plastic.

Also the present invention has such an arrangement that an eyeglass frame which includes a front frame made of metal or plastic, for holding lenses, a pair of temples made of metal or plastic and provided at both sides of a rear face of the front frame respectively, for nipping a head of a user, wherein an elastic body which is bent inwardly at, a middle portion thereof is provided respectively between the front frame and temple, and further a hinge is provided respectively between the front frame and elastic body.

Further the present invention has such an arrangement that an eyeglass frame including: a front frame made of metal or plastic, for holding lenses; a pair of temples made of metal or plastic and provided at both sides of the front frame respectively, for nipping a head of a user, wherein an elastic body which is bent inwardly at a middle portion thereof is provided respectively between the front frame and temple, and further a hinge is provided respectively between the elastic body and temple.

An eyeglass frame of the present invention includes a front frame made of metal or plastic for holding lenses, a pair of elastic body one end of which is disposed on the rear face of the front frame at both sides thereof, as well as the middle part of the elastic body being bent inwardly, and temples having end covers disposed respectively at the other end of the elastic body.

Accordingly, when temples are expanded, not only the temples are deformed but the whole temples can be displaced in the direction of expanding by means of the elastic body. In addition, the front frame made of metal or plastic can be slightly expanded so that inside surface of the end cover provided on the temple comes to contact with the head of a user via flat face. Thereby, contacting force on the user's head becomes smaller to reduce wearing consciousness, resulting in eliminating any risk of pain on the user's head while wearing.

BRIEF DESCRIPTION OF THE DRAWINGS

FIG. 2 is a schematic front view of the eyeglass frame shown in FIG. 1.

FIG. 3 is a schematic view of the eyeglass frame shown in FIG. 1, observed from diagonally above.

DESCRIPTION OF THE PREFERRED EMBODIMENTS

Figure 1:
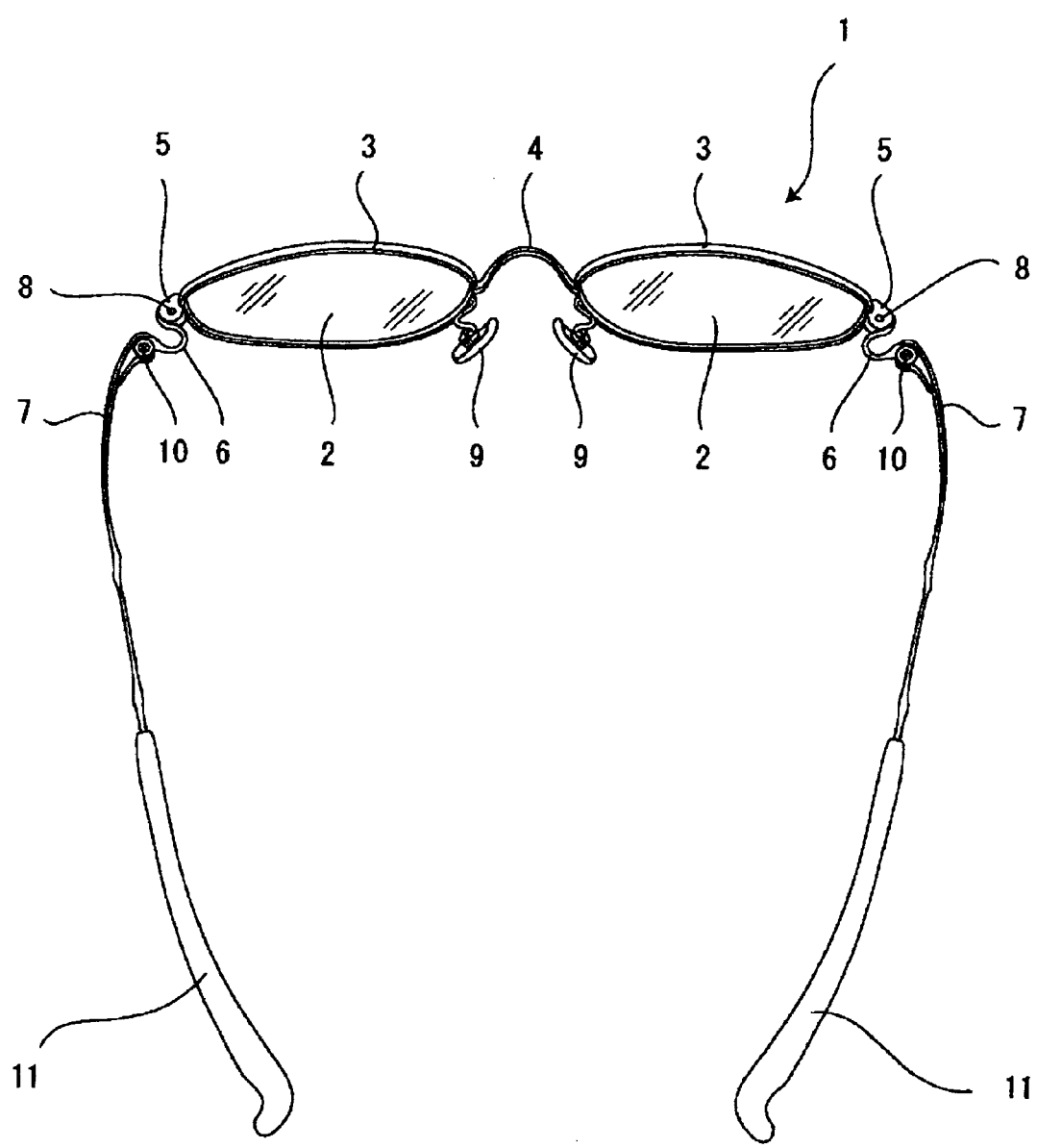
FIG. 1 is a schematic plan view showing a first aspect of an eyeglass frame according to the present invention.

Hereinafter embodiments of the present invention will be described referring to the drawings.

Figure 4:
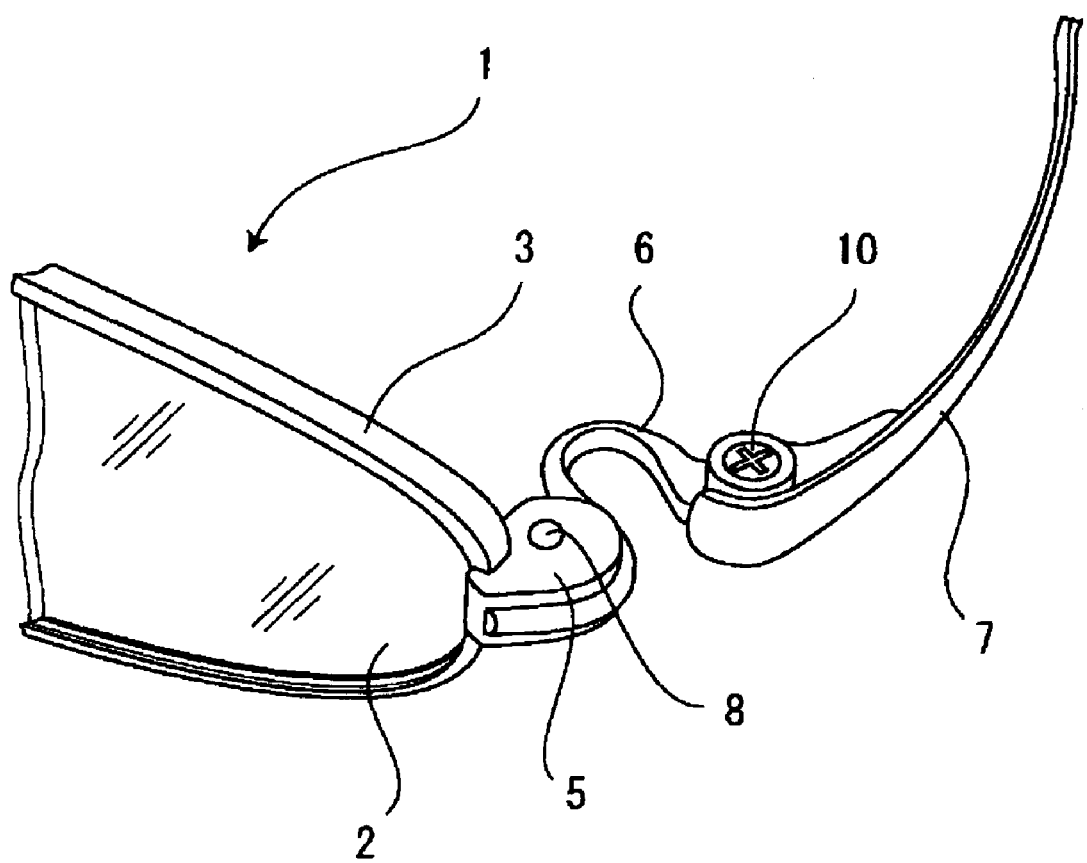
FIG. 4 is a schematic view showing connection condition of a front frame, an elastic body and a temple of the eyeglass frame shown in FIG. 1.

FIG. 1 is a plan view of an eyeglass frame 1 showing the first embodiment of the present invention, FIG. 2 is a schematic front view thereof, and FIG. 3 is a schematic view observed from diagonally above. In addition, FIG. 4 is a schematic view showing connection condition of a front frame, an elastic body and a temple.

The eyeglass frame 1 is a full rim type eyeglass frame made of metal and a pair of lenses 2, 2, left and right, are fitted thereto, the eyeglass frame 1 including rims 3, 3 forming a front frame which is joined at a bridge portion 4, armor portions 5, 5 disposed at the outer side of the rims 3, 3 which nip and release perimeter of the lenses 2, 2 when exchanging the lenses 2, 2 or doing the like, elastic bodies 6, 6 connected to the armor portions 5, 5, and the temples 7, 7 which are connected to the elastic bodies 6, 6 and nip the head of users above the ears thereof while pressing the same.

Screws 8, 8 are provided on the armor portions 5, 5 of the both sides of the rims. 3, 3. The rims 3, 3 can be released in accordance with screw tightening condition, and the lenses 2, 2 are placed in a released condition and then the screws are tightened, which can fix the lenses 2, 2.

The elastic bodies 6, 6 connected to the armor portions 5, 5 of the both sides of the rims 3, 3 are bent inwardly in reversed U-letter form at the middle portion thereof. The temples 7, 7 are attached to the elastic bodies 6, 6 via hinges 10, 10. Accordingly, the temples 7, 7 are foldable and expandable by means of the hinges 10, 10. Here, 9, 9 are nose pads contacted with the both sides of the nose of a user, and 11, 11 are end covers provided at the tips of the temples 7, 7.

In the eyeglass frame 1 arranged as described above, firstly the temples 7, 7 are expanded from a folded condition to the position ready to use. In order to start using, the head is inserted between the both temples 7, 7, in other words the user's head span above the both ears is nipped with the both temples 7, 7.

While nipping, in a case where both temples 7, 7 are expanded, not only the temples 7, 7 are expanded around the hinges 10, 10 as fulcrums, but also the elastic bodies 6, 6, which are connected to the hinges 10, 10 and are bent inwardly, comes to be deformed.

That is to say, when the span of both temples 7, 7 in an expanded situation is arranged to be smaller than that of the head, elastic deformation of the opposite side of the armor portion 5, 5 side in the elastic bodies 6, 6, as well as outward displacement of the temples 7, 7 around the hinges 10, 10 as fulcrums provided on the elastic bodies 6, 6, causes the temples 7, 7 themselves to contact with the head portion via flat faces.

Consequently, unlike the conventional eyeglass frame that a part of temples 7, 7 contacts with the user's head applying considerable force thereon, resulting in remarkable wearing consciousness, the temples 7, 7 concerned contact with the head via flat faces and apply small force to the head, and whereby users do not have remarkable wearing consciousness even for a long period of usage.

Moreover as the temples nip the user's head securely, there is no risk of slipping down or falling out of place at all.

Although the above embodiment illustrates an eyeglass frame of full rim type, it is not limited to that but half rim type and two points type may be accepted. Adoption of the elastic bodies 6, 6 and the temples 7, 7 connected to the elastic bodies 6, 6, which are bent inwardly, via the hinges 10, 10 realizes secured nipping with a small working force against the user's head via flat face contact.

Therefore there is no potential risk of pain at all even when users wear the glass for a long period of time.

Further, although in the example the elastic bodies 6, 6 and the temples 7, 7 are connected via the hinges 10, 10, alternatively the armor portions 5, 5 and the elastic bodies 6, 6 may be connected via the hinges 10, 10.

Figure 5:
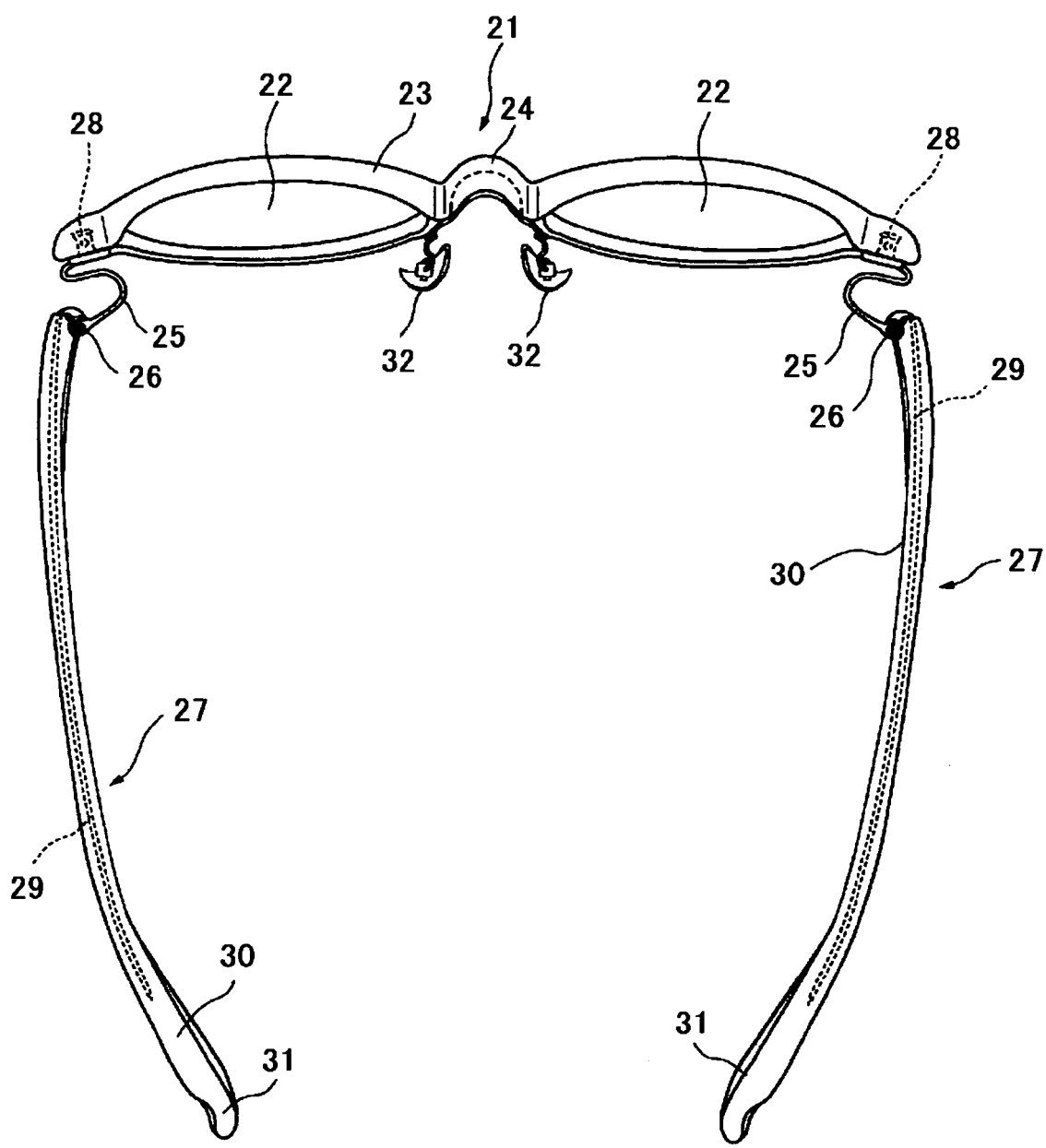
FIG. 5 is a schematic plan view showing a second embodiment of the present invention.
Figure 6:
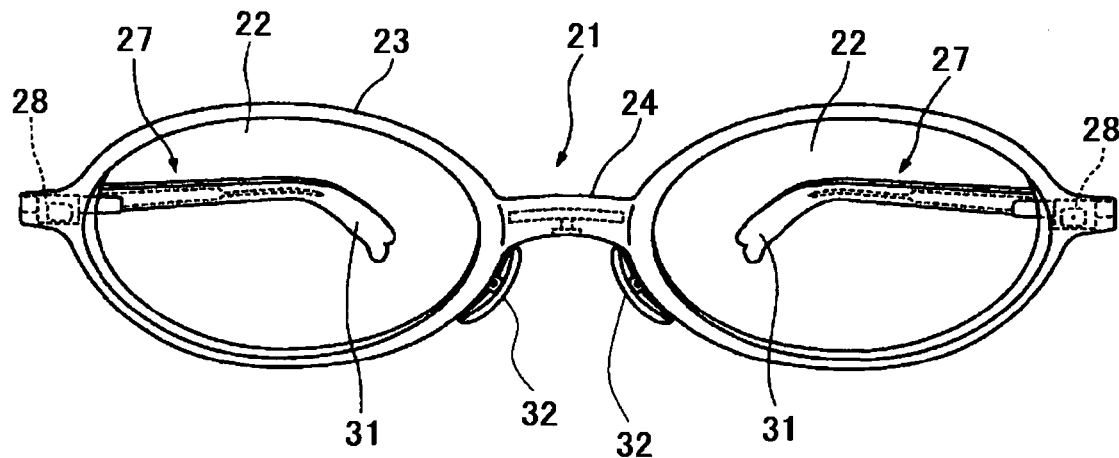
FIG. 6 is a schematic plan view of an eyeglass frame shown in FIG. 5.
Figure 7:
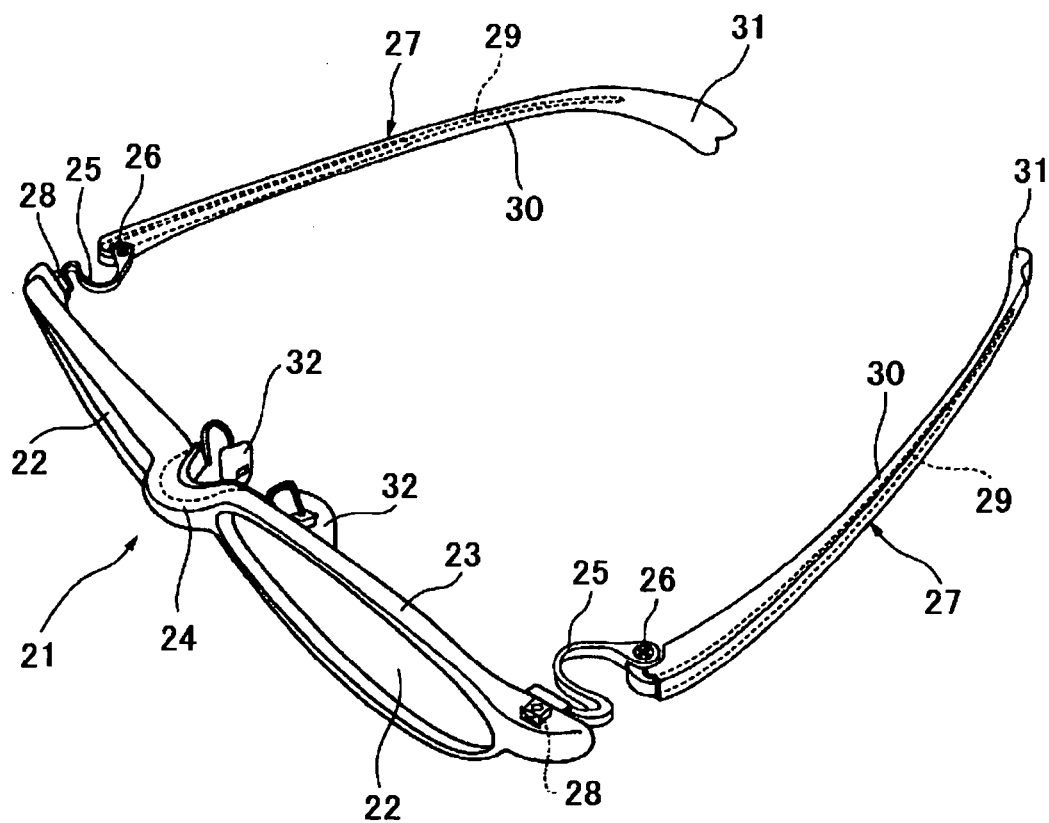
FIG. 7 is a schematic view of the eyeglass frame shown in FIG. 5, observed from diagonally above.

FIG. 5 to FIG. 7 show the second embodiment of eyeglass frame according to the present invention, and FIG. 5 is a schematic plan view of an eyeglass frame 21, FIG. 6 is a schematic front view, and FIG. 7 is a schematic view observed from diagonally above.

This eyeglass frame is made of plastic, being of full rim type, to which a pair of lenses 22, 22, left and right, are fixed, including a front frame 23 provided with a bridge 24 at the central portion, elastic bodies 25, 25 disposed at the both outer end sides on the rear face of the front frame 23, and the temples 27, 27 provided at the opposite sides of the front frame 23 in the elastic bodies 25, 25 via the hinges 26, 26 and is arranged to press user's head above the ears to nip the same position.

The elastic bodies 25, 25 provided on both sides of the front frame 23 are fixed to both outer side ends of the front frame 23 by embedding embedding portions 28, 28 provided at one end of the elastic bodies 25, 25 into the outer side ends of the front frame 23. At the same time, both elastic bodies are bent inwardly in a shape of reversed U-letter, and such forming causes high elasticity performance.

The temples 27, 27 provided at the other ends of both elastic bodies 25, 25 via the hinges 26, 26 are composed of core portions 29, 29 and cover portions 30, 30 covering the core portions 29, 29.

The ends of the elastic bodies 25, 25 and the core portions 29, 29 are connected to the hinges 26, 26. The temples 27, 27 are formed so that the covering portion 30, 30, which are composing members of the temples, are arranged to work as end covers 31, 31 at the opposite end of the elastic bodies 25, 25. Note that 32, 32 are the nose pads that contact with both sides of user's nose.

Accordingly, the temples 27, 27 are foldable between the position illustrated in the drawing and the folded position inwardly from the above position by hinges 26, 26.

In the eyeglass frame arranged as described above, firstly both temples 27, 27 are expanded from folded situation to be ready to-use by users. Thereafter a user inserts the head between the temples 27, 27 to nip the head across a span above both ears for starting usage.

Expansion of the temples 27, 27 while nipping the head is not only expansion around the hinges as fulcrums but the elastic bodies 25, 25 are deformed as well.

That is, when the span of the temples 27, 27 is initially set to be smaller than that of the head in an expanded situation, the fact that the other end portions of the elastic bodies 25, 25 referring to the embedded portions are expanded and deformed elastically having the embedded portion 28, 28 as fulcrums, and also a slight deformation of front frame made of plastic cause the temples 27, 27 themselves contact with the user's head via flat faces.

Consequently, unlike the conventional eyeglass frame that a part of temples 27, 27 contacts with the user's head applying considerable force thereon, resulting in remarkable wearing consciousness, the temples 27, 27 concerned contact with the head via flat faces and apply small force to the head, and whereby users do not have remarkable wearing consciousness even for a long period of usage. Moreover as the temples nip the user's head securely, there is no risk of slipping down or falling out of place at all.

Although the first embodiment is described such that the front frame is to be metal and also the temple is to be metal as well, the front frame may be metal and the temple may be made of plastic. Also the second embodiment is described such that the front frame is to be plastic and also the temple is to be plastic as well, but the front frame may be plastic and the temple may be metal.

Further, in the first embodiment the hinge is disposed between the elastic body and the temple but the hinge may be disposed between the elastic body and the armor, and in the second embodiment the hinge is disposed between the elastic body and the temple but the hinge may be disposed between the embedding portion and the elastic body.

Incidentally in the forementioned embodiments, full rim type eyeglass frame was described, but the present invention is not limited to that and the half rim type may also be accepted. Adoption of an elastic body which is bent inwardly and a temple connected to the elastic body via a hinge causes the contact with the user's head via a flat face and secured nipping with a small level of working force. Hence there is no risk of pain at all even if a user uses the glasses for a long period of usage.

What is claimed is:

1. An eyeglass frame comprising:
   a front frame made of metal or plastic, for holding lenses;
   a pair of temples made of metal or plastics and provided at both sides of a rear face of the front frame respectively, for nipping a head of a user;
   a pair of elastic bodies provided respectively between said front frame and the temple, each elastic body being a single member bent inwardly so as to form a U-shape, the elastic body having first and second ends respectively coupled to the front frame and the temple; and
   a pair of hinges provided respectively between the elastic body and the temple.

* * * * *